March 19, 1957 J. M. DOUGLASS 2,785,495
FISHING LURE
Filed Feb. 7, 1955
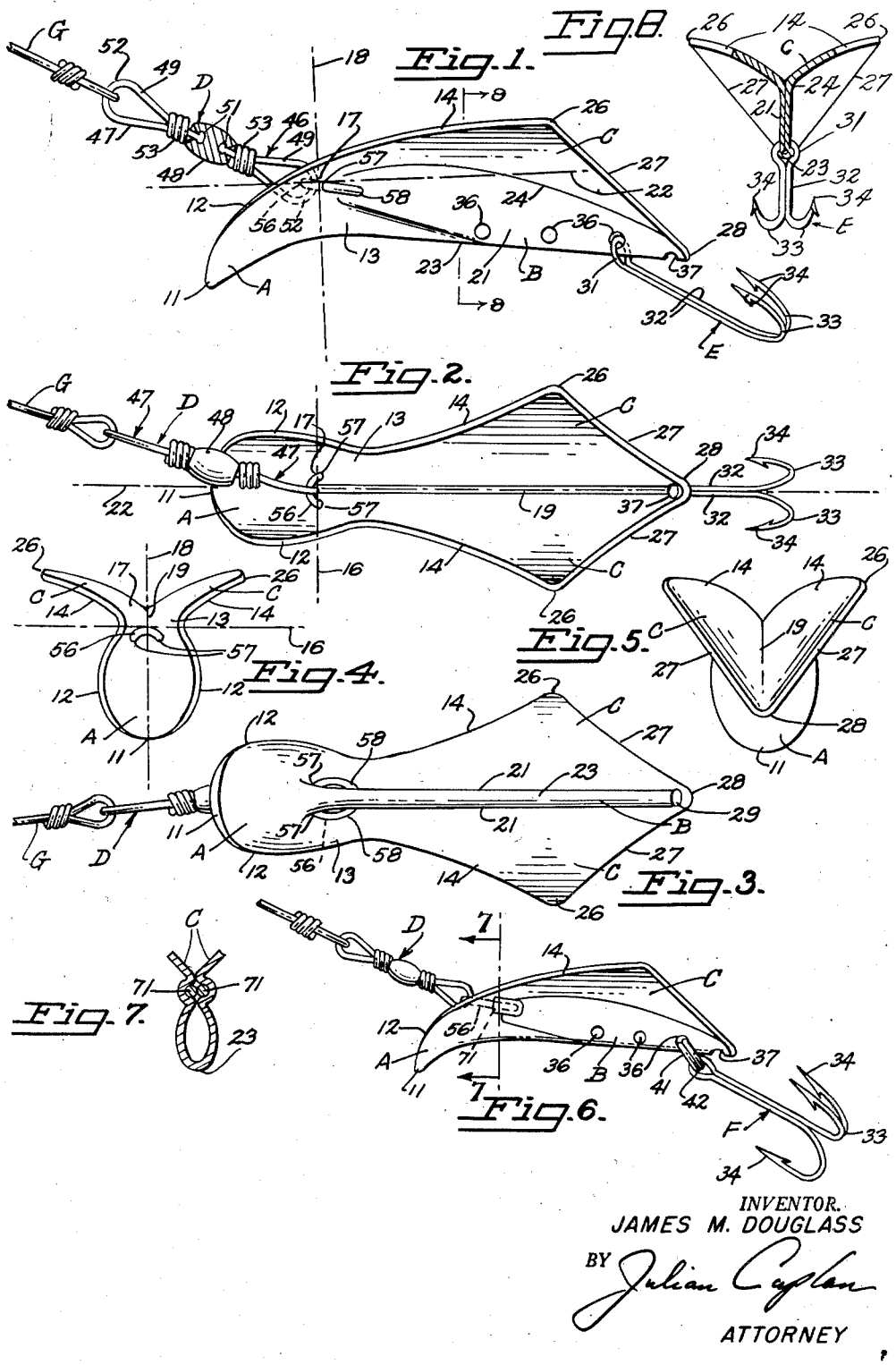
INVENTOR.
JAMES M. DOUGLASS
BY
ATTORNEY

United States Patent Office 2,785,495
Patented Mar. 19, 1957

2,785,495

FISHING LURE

James M. Douglass, San Mateo, Calif.

Application February 7, 1955, Serial No. 486,372

7 Claims. (Cl. 43—42.5)

This invention relates to a new and improved fishing lure. More particularly the invention relates to a metal lure of the spoon type which is characterized by the fact that its shape is such as to produce inherent instability about three axes each perpendicular to the other. Further, the instability of the lure is so calculated that the lure compensates as it turns about its various axes and oscillates in the opposite direction. Accordingly the effect of the lure is to produce an erratic movement which is a composite of oscillatory movement about the said three axes, this oscillatory movement being carried on simultaneously about the three axes.

Another feature of the lure is the fact that the position of attachment of the hooks to the body of the lure may be adjused whereupon the action of the lure is affected.

Still another feature of the invention is the fact that the lure is attached to the leader or filament by means of a swivel, which swivel may be bent whereupon the rolling action of the lure is affected, as hereinafter set forth.

As is generally understood in the fishing lure art, the effectiveness of a lure in attracting game fish resides in the action of the lure as it is drawn through the water on the retrieve from a cast or in a trolling action. The present invention is particularly effective by reason of the continuous erratic action which is produced.

Other objects of the present invention will become apparent upon reading the following specification and referring to the accompanying drawings in which similar characters of reference represent corresponding parts in each of the several views.

In the drawings:

Fig. 1 is a side elevation of the lure;

Fig. 2 is a top plan thereof;

Fig. 3 is a bottom plan thereof;

Fig. 4 is a front elevation of the lure;

Fig. 5 is a rear elevation;

Fig. 6 is a side elevation of a modified construction;

Fig. 7 is a fragmentary sectional view taken substantially on line 7—7 of Fig. 6 with certain portions of the lure omitted for the purpose of clarity of illustration; and Fig. 8 is a fragmentary vertical sectional view taken substantially along line 8—8 of Fig. 1.

The body of the lure which is the subject of this invention is formed of a single piece of metal shaped and bent in a peculiar configuration. Generally, the lure is long and relatively narrow and comprises a forward spoon portion A, a central lower keel or stabilizer portion B, and a pair of upwardly and outwardly extending wing portions C which rise above the keel B.

The spoon portion A at the front of the keel has a rounded front edge 11 at the lowest point of the lure viewed in side elevation. The side edges 12 of the spoon curve upwardly and then rearwardly. At the extreme rear end of the spoon portion, the side edges curve inwardly toward each other to form the narrow waist 13 immediately above the point of attachment of the lure to the swivel D as hereinafter set forth. The side edges converge into the forward side edges 14 of the wings C, as hereinafter set forth. Generally, the spoon portion A is concave when viewed from the front except the extreme forward part, where it is slightly convex. Accordingly the spoon A provides a considerable resistance or drag as the lure is drawn through the water, which drag tends to turn the lure downwardly about a transverse horizontal axis 16 through the point of attachment 17 of the swivel D. The concave nature of the spoon likewise produces an instability which tends to rotate the lure about a vertical axis 18 through the point of attachment 17 of the swivel inasmuch as the force of the relative movement of the lure and water inherently is to one side or the other of said axis 18.

The keel B is formed by creasing the central portion of the lure together in a crease 19 providing two vertical, parallel, planar, longitudinally-extending surfaces 21 of considerable length and height. Keel B, therefore, acts as a stabilizer tending to keep the lure from rotating about a longitudinal horizontal axis 22. The lower edge 23 of the keel is substantially straight. Its upper edge 24 is somewhat arcuate, the upper edge of the keel portion marking the beginning of the wing portions C which diverge outwardly from the keel B.

Each wing C is substantially triangular in plan, the front side edge 14 extending outwardly from the waist 17 at an angle of approximately 30 degrees in plan toward a wing tip 26 approximately three-quarters of the length of the lure rearwardly from the front tip 11 thereof. The wing tip 26 is rounded and rearwardly thereof the rear side edge 27 of the wing extends backwardly toward the rear tip 28 of the lure. The angle between the front side edge 14 and rear side edge 27 of the wing tip is substantially 90 degrees in plan. The wings C rise upwardly and outwardly from the top edge 24 of the keel B with a slight curvature, as viewed in front or rear elevation. A transverse dihedral angle between the wing surfaces C is thus provided which angle may be adjusted in order to affect the depth of travel of the lure below the surface, as hereinafter described. The rear tip 28 of the wings is rounded and merges into the extreme rear tip 29 of the keel B.

As shown in Fig. 1, a double hook E is employed. For such purpose the hook E is formed of a single piece of wire having an eye 31 at one end which merges into a pair of parallel long shanks 32, the outer ends of which are bent in curves 33 into the hook portions which terminate in barbs 34 at the outer ends. The eye 31 is bent upwardly at an angle relative to the shanks 32. By reason of the fact that the two shanks 32 are separate and can be spread apart, the hook E may be inserted in any of a plurality of holes 36 or 37 extending transversely through the keel B. For such purpose, one of the barbs 34 is inserted through the desired hole and the two shanks 32 sprung apart sufficiently so that one of the shanks may be threaded through the hole until the eye 31 seats in the hole. By reason of the angle between the eye 31 and the shanks 32 the hooks assume the position shown in Figs. 1 and 2, when drawn through the water which prevents the barbs 34 from snagging in the body of the lure and interfering with the hooking of the fish. As shown in the drawings, there are three transverse holes 36 in the keel through which the hook may be inserted. At the extreme rearward end of the lure is a fourth or vertical hole 37. Selection of the proper hole 36 or 37 affects the speed of the action of the lure inasmuch as the hook E creates a resistance to oscillatory movement somewhat in the same fashion as a sea anchor affects the action of a boat. Thus the farther back the hook is located, the greater the resistance to movement of the lure.

As shown in Fig. 6, a conventional three-prong hook F may be employed. For attaching hook F a split ring 41 is inserted through the proper hole 36 or 37 in the keel and through the eye 42 of the hook.

The lure is attached to the line G by means of swivel D. Such a swivel comprises a rear eye portion 46, a front eye portion 47 and a barrel 48. Each eye portion comprises a shank 49 having an enlargement 51 at one end received and rotatably held in the barrel 48. The bight 52 at the opposite end of the shank is brought around and wrapped about the shank 49 in a coil 53. As shown in Fig. 1, the swivel D is attached to the lure by a piece of wire formed in a bight 56 which passes through the bight 49 of the rear eye portion 46 and thence through a pair of holes 57 in the waist 17 so that the ends of the bight 56 are on the outside of the lure rather than in the central crease 19 thereof. The rearward ends 58 of the wire are bent sharply backwardly and forced inwardly tightly against the keel B so that there is no likelihood of the wire snagging in weeds, etc.

An alternative construction is shown in Figs. 6 and 7. In such construction, the bight 56 does not pass outwardly through holes 57, but is received in the crease 19 and extends partway back into the keel. The ends 61 of the wire are retained in the keel by swedging the outside of the keel in the vicinity of the ends 61 to lock the same in place.

The swivel D may be bent to affect the action of the lure. If the swivel is bent, as best shown in Fig. 2, the degree of bending materially affects the rolling action of the lure. The swivel D may be bent by gripping the front eye portion 47 in one hand, and the lure in the other, with the swivel D extending vertically upwardly, and then bending the front eye portion outwardly, using the edge 12 as a fulcrum.

It will thus be seen that a lure is provided which has an extremely effective action. As the lure is drawn through the water by means of the swivel D, the spoon A tends to tip the forward end of the lure downwardly about a transverse horizontal axis 16 through the point of attachment 17 of the swivel D to the bight 56. This downward tipping action is resisted by the force of the water against the upper surfaces of the wings C and as the lure tips downwardly, the effective area of the wings subjected to the water is increased until the downward tipping movement is overcome and the direction of movement is reversed. This oscillatory dipping movement is continuously repeated.

At the same time, by reason of the fact that the spoon A is at the front of the lure ahead of the point of attachment 17, and further by reason of the fact that the concavity of the spoon A must inherently force the lure about a vertical axis 18 in one direction or the other, the lure tends to rotate in one direction about vertical axis 18 through the point of attachment 17. This movement is resisted by the keel B and as the amplitude of the twisting movement increases, the effective area presented to the force of the water by the surface 21 of keel B is increased until the twisting movement is counterbalanced and the lure tends to rotate in the opposite direction. The amount of twisting movement about axis 18 may be adjusted by twisting the spoon A with the fingers or a pliers.

The rolling action of the lure about a longitudinal horizontal axis 22 is affected by the curvature of the swivel D and by the shape of the spoon A. The surfaces of the wings C resist this movement, counterbalance it and cause rolling movement in the opposite direction.

The depth of travel of the lure is affected by the transverse dihedral angle between the wings C. A wide dihedral angle produces deep running, whereas a small dihedral angle produces shallow running of the lure.

It will be apparent from the foregoing description of the action of the lure that the lure may be caused to run near the surface or deep, and may be given a fast or slow action, depending upon the position of the hooks E or F. The amount of roll may be adjusted by curvature of the swivel D or twisting of the spoon A. In any event, a very erratic, continuous movement about three separate axes 16, 18 and 22 is produced. The lure is particularly satisfactory either for fly-casting or spin-casting, depending upon the size of the lure.

Although the foregoing invention has been described in some detail by way of illustration and example for purposes of clarity of understanding, it is understood that certain changes and modifications may be practiced within the spirit of the invention and scope of the appended claims.

What is claimed is:

1. A fishing lure having a one-piece metallic body formed with a spoon at the front end thereof, a keel rearwardly of said spoon formed by an upward crease in said body, and a pair of wings diverging upwardly and outwardly of said keel; said spoon being substantially concave and curving forwardly-downwardly from said keel, the forward and lower end of said spoon being rounded and the edges of said spoon curving upwardly and outwardly, thence upwardly rearwardly, and thence inwardly to a narrow waist immediately above the forward end of said keel; said keel having a substantially straight lower edge and flat, parallel sides extending upwardly substantially one-half the height of said lure, the upper edges of said keel being arcuately upwardly convex and merging into the inner edges of said wings, said keel being apertured in a plurality of longitudinally spaced apertures; each said wing being shaped in substantially a right triangle in plan with the hypotenuse merging with said keel along one of said upper edges of said keel and the forward side edges of said wings merging with said waist; a hook attached to one of said apertures in said keel; line attachment means having an eye; and a wire having a bight passing through said eye in said line attachment means, said wire being attached to said lure at said waist.

2. A lure according to claim 1 in which said line attachment means comprises a swivel having a front eye portion having a first shank terminating in a first enlargement, a rear eye portion having a second shank terminating in a second enlargement, and a barrel enclosing and retaining said first and second enlargements, one of said shanks being bent from a straight line so that said eyes and barrel lie on a curve.

3. A lure according to claim 1 in which said wire is embedded in the crease in the forward end of said keel.

4. A fishing lure having a one-piece metallic body formed with a spoon at the front end thereof, a keel rearwardly of said spoon formed by an upward crease in said body, and a pair of wings diverging upwardly and outwardly of said keel; said spoon being substantially concave and curving forwardly-downwardly from said keel, the forward and lower end of said spoon being rounded and the edges of said spoon curving upwardly and outwardly, thence upwardly rearwardly, and thence inwardly to a narrow waist immediately above the forward end of said keel; said keel having a substantially straight lower edge and flat, parallel sides extending upwardly substantially one-half the height of said lure, the upper edges of said keel being arcuately upwardly convex and merging into the inner edges of said wings, said keel being apertured in a plurality of longitudinally spaced apertures; each said wing being shaped in substantially a right triangle in plan with the hypotenuse merging with said keel along one of said upper edges of said keel and the forward side edges of said wings merging with said waist; a hook having an eye, a split ring passing through said eye of said hook and one of said apertures in said keel; a swivel having a first shank terminating in a first enlargement, a rear eye portion having a second shank terminating in a second enlargement, and a barrel enclosing and retaining said first and second enlargements, one of said shanks being bent from a straight line so that said eyes and barrel lie on a curve; and a wire having a bight passing through the rear eye of said swivel and imbedded in the crease in the forward end of said crease, said bight being located at said waist.

5. A fishing lure having a one-piece metallic body formed with a spoon at the front end thereof, a keel rearwardly of said spoon formed by an upward crease in said body, and a pair of wings diverging upwardly and outwardly of said keel; said spoon being substantially concave and curving forwardly-downwardly from said keel, the forward and lower end of said spoon being rounded and the edges of said spoon curving upwardly and outwardly, thence upwardly rearwardly, and thence inwardly to a narrow waist immediately above the forward end of said keel; said keel having a substantially straight lower edge and flat, parallel sides extending upwardly substantially one-half the height of said lure, the upper edges of said keel being arcuately upwardly convex merging into the inner edges of said wings, said keel being apertured in a plurality of longitudinally spaced apertures; each said wing being shaped in substantially a right triangle in plan with the hypotenuse merging with said keel along one of said upper edges of said keel and the forward side edges of said wings merging with said waist; a hook, means for attaching said hook to said lure adjacent said keel; a tang struck upwardly forwardly of said lure adjacent the waist thereof, said tang being apertured in its outer end and a swivel attached to the aperture in said tang.

6. A lure according to claim 1 in which said hook comprises two barbs, two shanks and an eye at the juncture of said shanks, said eye fitting through one of said apertures in said keel.

7. A lure according to claim 1 in which said wire forcedly abuts the sides of the keel.

References Cited in the file of this patent

UNITED STATES PATENTS

| | | |
|---|---|---|
| 167,687 | Pitcher | Sept. 14, 1875 |
| 1,497,023 | Palmer | June 10, 1924 |
| 1,742,786 | Roberts | Jan. 7, 1930 |
| 1,963,380 | Peters et al. | June 19, 1934 |
| 2,088,775 | Davenport | Aug. 3, 1937 |
| 2,394,132 | Zeibig | Feb. 5, 1946 |
| 2,511,002 | Perry | June 13, 1950 |
| 2,645,875 | Chase | July 21, 1953 |